United States Patent [19]

Gama et al.

[11] 4,022,658

[45] May 10, 1977

[54] THERMAL SHIELD SYSTEM FOR THE PRIMARY VESSEL SUSPENSION STRAKE OF A FAST REACTOR

[75] Inventors: Jean-Michel Gama, Orsay; Jean-Pierre Kung, Le Plessis Robinson, both of France

[73] Assignee: Commissariat a l'Energie Atomique, Paris, France

[22] Filed: July 14, 1975

[21] Appl. No.: 595,483

[30] Foreign Application Priority Data

Aug. 30, 1974 France .............................. 74.29652

[52] U.S. Cl. .................................. 176/40; 176/65; 176/87; 52/224; 52/248
[51] Int. Cl.² ......................................... G21C 15/04
[58] Field of Search ........... 176/40, 65, 87; 52/224, 52/248, 249

[56] References Cited

UNITED STATES PATENTS

| 3,362,567 | 1/1968 | Rudock | 176/87 X |
|---|---|---|---|
| 3,548,931 | 12/1970 | Germer et al. | 176/87 X |
| 3,640,032 | 2/1972 | Jubb | 52/224 X |
| 3,708,393 | 1/1973 | Waymire et al. | 176/40 X |
| 3,764,468 | 10/1973 | Hind | 176/87 X |

Primary Examiner—Samuel W. Engle
Assistant Examiner—Peter A. Nelson
Attorney, Agent, or Firm—Cameron, Kerkam, Sutton, Stowell & Stowell

[57] ABSTRACT

A heat-insulating structure is placed within an annular space located between the primary vessel suspension strake of a fast reactor and the cylindrical shell of a top concrete closure slab from which the primary vessel is suspended. The heat-insulating structure is tightly applied on one side against the primary vessel wall and on the other side against the cylindrical shell.

3 Claims, 3 Drawing Figures

THERMAL SHIELD SYSTEM FOR THE PRIMARY VESSEL SUSPENSION STRAKE OF A FAST REACTOR

This invention relates to a thermal shield system for protecting the upper portion or suspension strake of an open-topped primary vessel having a vertical axis which contains the core of a fast reactor and a volume of suitable liquid metal coolant usually consisting of liquid sodium, an atmosphere of neutral gas usually consisting of argon being present within the vessel above the liquid sodium. The primary vessel is suspended from a shield slab constituting a top closure for a concrete containment structure which surrounds the vessel, said vessel being designed in the form of a rigid horizontal element provided with penetrations, especially in order to give access to the reactor core.

In the design solutions which are at present employed in fast reactors, the top closure slab is provided with a horizontal base plate usually formed of stainless steel and against which is applied a closure slab constituted by a concrete body of sufficient thickness. Said base plate is delimited laterally by a cylindrical shell which is parallel to the vessel wall and terminates in a flat horizontal rim, said rim being welded at its periphery to the primary vessel which is anchored in the closure slab structure above the welded joint. An annular space is thus defined between the top portion or suspension strake of the primary vessel and the cylindrical shell of the closure slab beneath the flat rim, said space being intended to communicate with the neutral gas atmosphere within the vessel. Within said space, the oppositely-facing vessel wall is subjected to a high thermal gradient resulting from a transition between the temperature of the sodium within the vessel of the order of 380° C and the temperature of the top closure slab which is of the order of 40° C. This abrupt transistion gives rise in particular to mechanical stresses in the connection between the closure slab and the vessel suspension strake ; it also has a contributory effect in initiating and maintaining an argon thermosiphon between the closure slab and the vessel within the annular space. Similarly, in the usual case in which the primary vessel is surrounded externally by a second vessel or containment vessel which is also suspended from the top closure slab, the space formed between the two vessels being filled with a neutral gas which may or may not be different from the first and usually consists of nitrogen, a thermosiphon circulation of said gas is established and is detrimental to the mechanical resistance of the two vessels.

This invention has for its object a thermal shield system which serves to eliminate thermal gradients at the level of the primary vessel suspension strake, thus preventing the establishment of gas thermosiphons which are liable to produce harmful effects on the connection with the closure slab and to give rise to major accident conditions.

To this end, the system under consideration essentially comprises a heat-insulating structure which is housed within the annular space between the primary vessel suspension strake and the cylindrical shell of the top closure slab, said heat-insulating structure being tightly applied on the one hand against the primary vessel wall and on the other hand against the cylindrical shell.

Preferably, the heat-insulating structure is constructed in accordance with the arrangements described and claimed in U.S. Pat. Nos. 3,945,887 and 3,945,165.

This heat-insulating structure is constituted in particular by a stack of parallel plates, trelliswork or wire fabric elements, said stack being mounted within interengaged metallic supporting elements forming a single-unit assembly of predetermined dimensions, thus providing an effective thermal barrier and also making it possible to trap any sodium aerosols which may condense on this latter.

In one particular embodiment of the invention, the heat-insulating structure is constituted by two assemblies mounted in juxtaposed relation, one assembly being fixed on the primary vessel suspension strake and the other assembly being fixed on the culindrical shell, the second assembly which has previously been compacted towards the cylindrical shell being subsequently released and tightly applied against the first assembly.

In another embodiment, the heat-insulating structure is fixed by means of studs or the like against the cylindrical shell and against the vessel suspension strake at the upper portion thereof and against said suspension strake at the lower portion thereof below the base plate of the closure slab.

Further properties of a thermal shield system for the primary vessel suspension stake of a fast reactor as constructed in accordance with the invention will become apparent from the following description of two exemplified embodiments which are given by way of indication and not in any limiting sense, reference being made to the accompanying drawings, in which.

Figure 1:
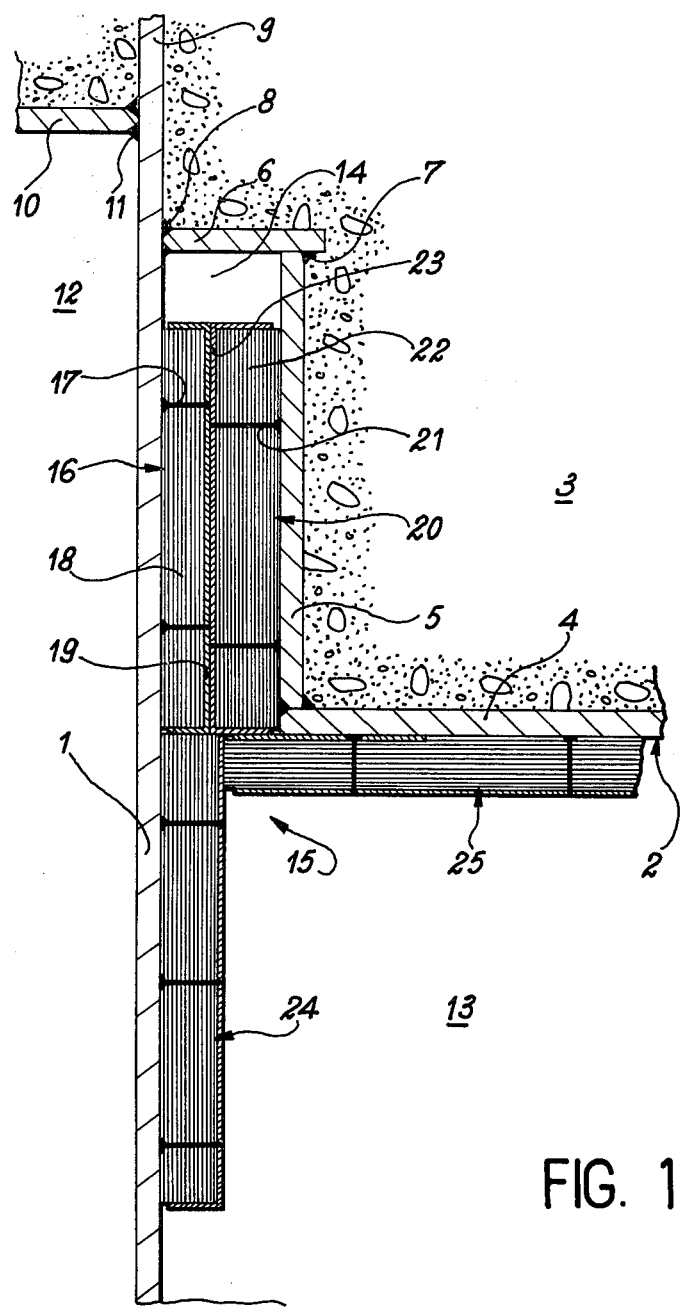
FIG. 1 is a diagrammatic fragmentary vertical sectional view of the primary vessel suspension strake of a fast reactor together with a supporting closure slab, these two elements being so arranged as to delimit between them an annular space for receiving a shield system in accordance with the invention.

In the example of construction shown in FIG. 1, the reference numeral 1 designates the upper portion or suspension strake of the primary vessel of a fast reactor of a type which is well-known per se. The reactor core and the volume of coolant sodium contained in this latter within the interior of said primary vessel have not been illustrated. The vessel has a generally cylindrical shape with a vertical axis and is closed by a top shield slab 2 which is essentially constituted by a thickness 3 of concrete. The bottom slab face which is directed towards the primary vessel is lined with a stainless steel base plate 4 and this latter is provided with an extension in the form of a cylindrical shell 5 on the sides of said closure slab 2. Said cylindrical shell is coaxial with the primary vessel suspension strake 1 and terminates at the upper extremity in a horizontal transverse rim 6. Said rim is welded at 7 to the shell and at 8 to the vessel support strake 1 which extends above and within the interior of the concrete body 3 of the closure slab by means of a portion 9 which is embedded in this latter. On the face located opposite to the flat rim 6, the suspension strake 1 is rigidly fixed to a flat annular flange 10 which is welded at 11 and delimits a space 12 filled with nitrogen between the primary vessel wall 1 and a second vessel or so-called containment vessel (not shown) which is placed externally around the primary vessel. Provision is made within the interior of the primary vessel beneath the top closure slab 2 for a region 13 which is located above the level of sodium and filled with argon, said region 13 being intended to communicate with the annular space 14 formed between the vessel suspension strake 1 and the cylindrical shell 5 beneath the transverse rim 6.

Figure 2:
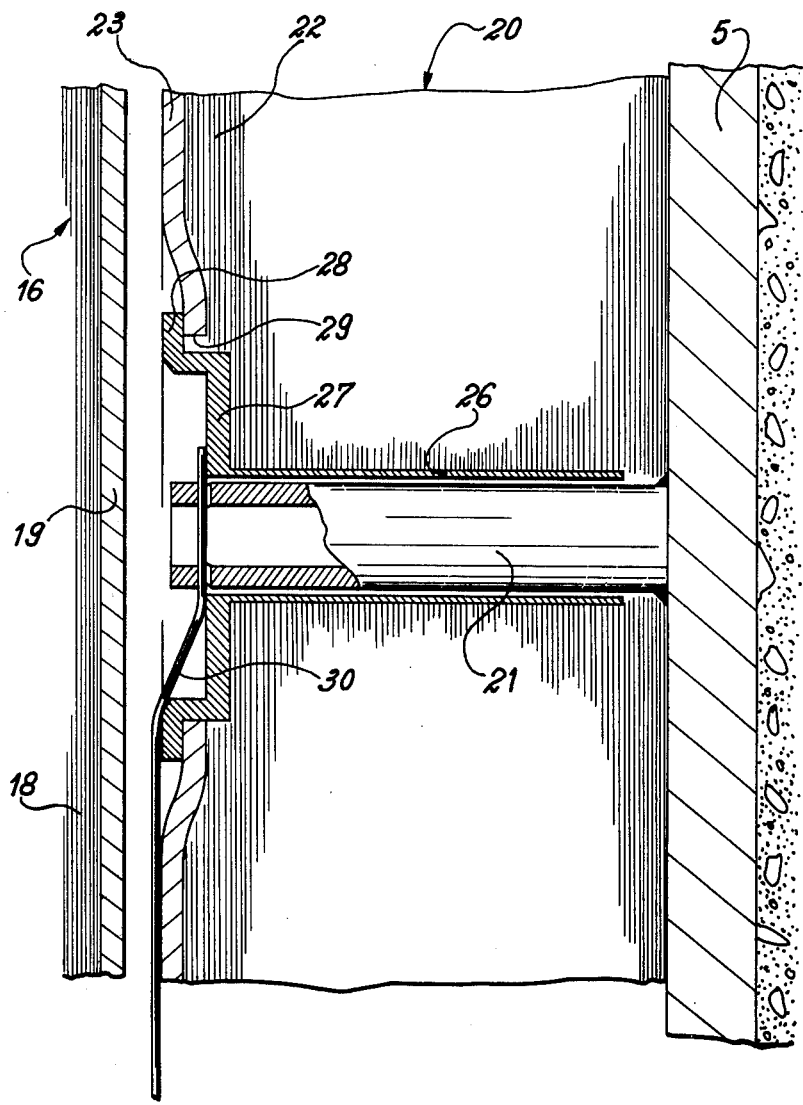
FIG. 2 is a detail view to a larger scale showing the heat-insulating structure which has been placed in position within the interior of the annular space as shown in FIG. 1.

In accordance with the invention, the thermal shield for protecting the primary vessel suspension strake 1 at the level of the annular space 14 is provided by means of a heat-insulating structure, the constructional detail of which appears in FIGS. 1 and 2 in a first form of execution. This structure is designated by the reference 15 and is made up of a number of elements, esepecially a first assembly 16 which is applied against the opposite face of the vessel suspension strake 1 by means of fixing studs 17. Said assembly 16 is preferably constructed in accordance with the arrangements described and claimed in the prior patent Applications of the Commissariat a l'Energie Atomique which were cited earlier. Said assembly accordingly comprises in particular a stack of trelliswork, wire fabric or thin sheet metal elements 19 mounted within the interior of a metallic casing 19 which contains said stack while permitting a certain elasticity at the time of assembly by virtue of the relative compressibility of the stack contained therein. The assembly 16 which is applied against the vessel suspension strake 1 is then lined on the side nearest the shell 5 of the closure slab with a second assembly 20 which is fixed against the cylindrical shell by means of studs 21. As in the case of the first assembly, said second assembly comprises a stack of wire fabric or sheet metal elements 22, said stack being held within a casing 23 and maintained applied against the casing 19 of the assembly 16. The heat-insulating structure is then completed by a third assembly 24 which is fixed against the vessel suspension strake 1 beneath the first assembly 16 and by a last assembly 25 which extends horizontally beneath the base plate 4 of the closure slab 2 and is secured by means of studs as in the previous case.

FIG. 2 illustrates in greater detail the practical construction of the heat-insulating assembly 20 which is fixed against the cylidrical shell 5 of the closure slab and shows the manner in which said assembly is mounted. The first assembly 16 having previously been fixed against the suspension strake 1 within the annular space 14, the assembly 20 is placed in position over the heads of the fixing studs 21 which are rigidly fixed to the cylindrical shell 5, this operation being performed after having first compressed the stack of wire fabric or sheet metal elements 22 by suitably displacing the wall of the casing 23 in the direction of the cylindrical shell. To this end, the studs 21 each serve as a guide for a sleeve 26 terminating in a flanged annular end portion 27 having a rim 28. Said end portion is adapted to fit within an opening 29 formed in the sheet metal of the casing 23 and is applied against the edges of said opening so as to permit of compression towards the shell of the stack 22. The assembly is maintained in a compressed position by means of a piano wire 30 or the like which is wound around the end of the stud 21 within the interior of the flanged sleeve end 27. Once the assemblies 16 and 20 have been fitted in position within the space 14, the piano wire 30 is withdrawn, thereby permitting the expansion of the stack 22, the application of the walls of the casings 19 and 23 in contact with each other and the possibility of displacement of said walls if necessary. This in turn makes it possible to closeoff the space 14 and especially to prevent the hot argon contained in the region 13 beneath the top closure slab from circulating by a thermosiphon process towards the primary vessel suspension strake 1 and especially the top portion of this latter which is embedded in the closure slab itself, said slab being maintained at an appreciably lower temperature.

Figure 3:
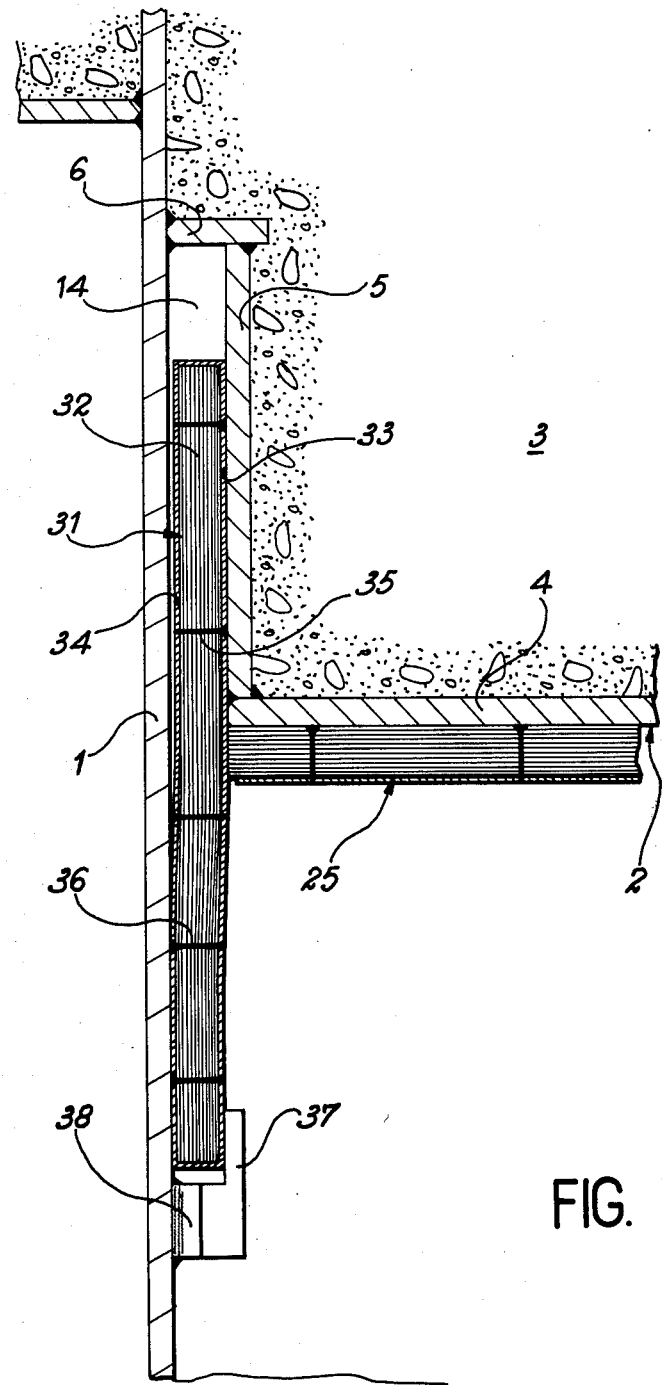
FIG. 3 is a diagrammatic fragmentary vertical sectional view of another alternative embodiment.

In a second alternative embodiment which is illustrated in FIG. 3, the heat-insulating structure mounted within the annular space 14 between the vessel suspension strake 1 and the cylindrical shell 5 of the closure slab 2 is formed by a single-unit assembly which preferably incorporates as in the previous example a stack of wire fabric, trelliswork or thin sheet metal elements 32, said stack being maintained between the two metallic walls 33 and 34 of a casing. Said assembly 31 is secured on the one hand to the cylindrical shell 5 of the closure slab by means of a series of studs 35 and, on the other hand, to the vessel suspension strake 1 by means of another set of studs 36 at a lower level than that of the base plate 4. Mounting against the vessel suspension strake 1 is advantageously completed by lateral retaining lugs 37 which are welded at 38 against the vessel suspension strake within the interior of this latter.

Whatever form of construction may be adopted, the annular space located between the cylindrical shell of the top closure slab and the primary vessel suspension strake is thus effectively isolated from the neutral gas at high temperature which is present above the level of sodium within the interior of the primary vessel. As a consequence, the thermal gradient within the top portion of said vessel is considerably reduced while interrupting any thermosiphon processes which would otherwise be liable to take place with small leakages both across and between the assemblies of the heat-insulating structure. It will remain apparent, however, that the invention is not limited solely to the constructional examples which have been more especially described in the foregoing with reference to the accompanying drawings but extends on the contrary to all alternative forms.

What we claim is:

1. A thermal shield system for a primary vessel suspension strake of a fast reactor in which said suspension strake defines an annular space with a lateral cylindrical shell surrounding a concrete slab which closes an upper extremity of the primary vessel and from which said vessel is suspended, said annular space communicating with an atmosphere of neutral gas contained within the vessel beneath a base plate which extends beneath the concrete slab, comprising a heat-insulating structure within said annular space between said vessel suspension strake and said cylindrical shell of said top closure slab, means for fixing said heat-insulating structure against said primary vessel wall and against said cylindrical shell.

2. A thermal shield system for a primary vessel suspension strake of a fast reactor in which said suspension strake defines an annular space with a lateral cylindrical shell surrounding a concrete slab which closes an upper extremity of the primary vessel and from which said vessel is suspended, said annular space communicating with an atomosphere of neutral gas contained within the vessel beneath a base plate which extends beneath the concrete slab, comprising a heat-insulating structure within said annular space between said vessel suspension strake and said cylindrical shell of said top closure slab, said heat-insulating structure being tightly applied against said primary vessel wall and against said cylindrical shell, wherein said heat-insulating structure comprises first and second assemblies in juxtaposed relation, the first of said assemblies being fixed on said primary vessel suspension strake and the second of said assemblies being fixed on said cylindrical shell, said second assembly being compacted towards said cylindrical shell and then being released and tightly applied against said first assembly.

3. A thermal shield system according to claim 1, wherein said means for fixing comprises studs against said cylindrical shell of said closure slab at the upper portion thereof and against said suspension strake at the lower portion thereof below said base plate of said closure slab.

* * * * *